April 24, 1928.
M. M. MENZEL
1,667,329
MEAT BLOCK SCRAPER AND DRESSER
Filed Oct. 12, 1925
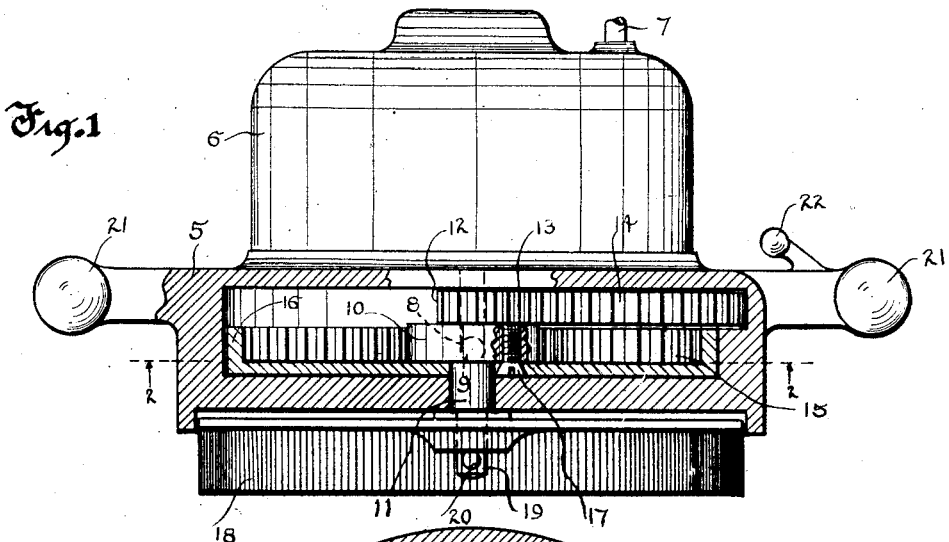
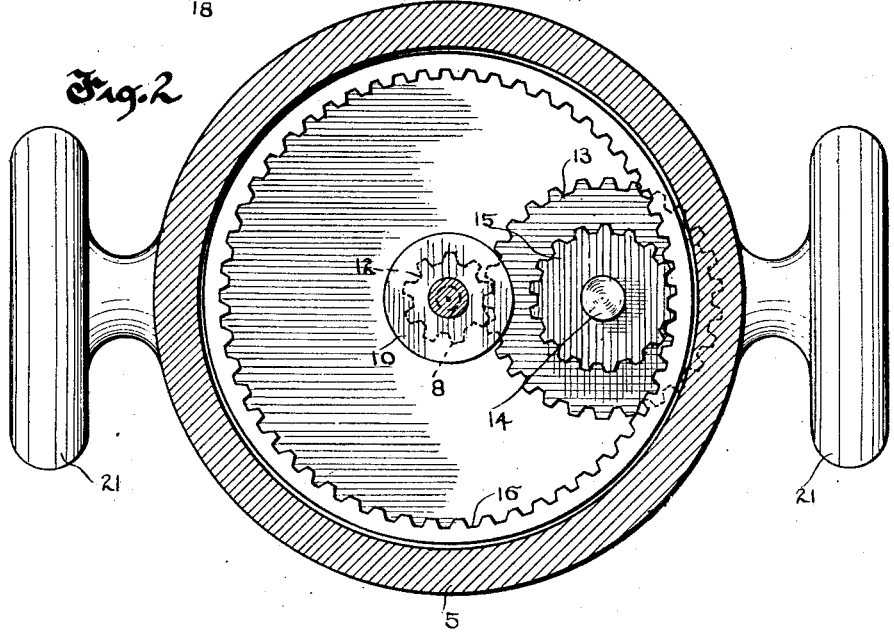
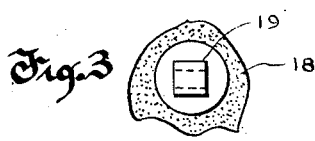
INVENTOR.
Max M. Menzel.
BY
Morsell, Kinney & Morsell,
ATTORNEYS.

Patented Apr. 24, 1928.

1,667,329

UNITED STATES PATENT OFFICE.

MAX M. MENZEL, OF KENOSHA, WISCONSIN.

MEAT-BLOCK SCRAPER AND DRESSER.

Application filed October 12, 1925. Serial No. 62,026.

This invention relates to improvements in meat block scrapers and dressers, and more particularly to an electrically operated, revolving scraper and dresser.

At the present time it is the custom with butchers to scrape and dress their meat blocks at the expiration of each day's business to render the blocks sanitary and ready for use the following day. The dressing and scraping is done by means of brushes and hand applied, manually operated tools, and the work, as a result, is both tedious and time consuming. Also, the results are not always of the best and periodically it is necessary to take off the surface of the block.

It is, therefore, the principal object of the present invention to overcome the foregoing objections by providing an automatic electric meat block dresser and scraper which is easily operated and very efficient.

A further object of the invention is to provide a device of the class described with which a circular brush, rasp, and like tools may be interchangeably used.

A further object of the invention is to provide a device of the class described which may be connected with any source of electrical supply and which is light and is easily handled and operated.

A further object of the invention is to provide a meat block scraper and dresser which is of very simple construction, is inexpensive to manufacture and use, is strong and durable, and is well adapted for the purposes described.

With the above and other objects in view the invention consists of the improved meat block scraper and dresser, and its parts and combinations as set forth in the claim and all equivalents thereof.

In the accompanying drawing in which the same reference characters indicate the same parts in all of the views:

Fig. 1 is a side view of the improved meat block scraper and dresser, parts being broken away and shown in section to show details of construction;

Fig. 2 is a sectional view taken on line 2—2 of Fig. 1; and

Fig. 3 is an enlarged fragmentary detail view.

Referring now more particularly to the drawing it will appear that the numeral 5 designates the frame or shell of the meat block scraper and dresser and mounted thereabove is an electric motor 6, of any commercial type having circuit wires 7 extending therefrom for attachment with a source of electrical supply.

The drive shaft 8 of the motor extends into the interior of the shell and is journaled in a ball bearing 9 located in a socket formed in the enlarged head portion 10 of a stud shaft or pin 11. The intermediate portion of the drive shaft 8 has keyed thereto a small gear 12 arranged to mesh with a large gear 13 mounted on a shaft 14, which shaft also carries a gear 15. Said gears 12, 13, and 15 serve as speed reducing gears and transmit rotation to a ring gear 16, with which the gear 15 is in mesh. The ring gear 16 is secured fast to the headed portion 10 of the stud shaft 11 by means of screws 17, and rotates said stud shaft at a reduced rate of speed.

The bottom face of the frame or shell 5 is formed with a circular recess in which is disposed the base portion of a brush member 18, the brush being centrally mounted on the squared outer end portion 19 of the stud shaft 11 and removably retained thereon by means of a pin 20.

The brush member 18 is circular in form and comprises a base or back in which are mounted a plurality of wire bristles. In this connection it should be noted that the brush is readily removable and may be replaced by a circular rasp member or suitable tool of similar design.

A pair of handle portions 21 extend outwardly from the side portions of the shell for manually grasping and operating the device and circuit wires extend into one of the handles and to a switch 22 which is readily accessible for controlling the flow of current to the motor.

In use, the motor is operated and the brush member is revolved through the reducing gears. The device may be manually pushed over the surface of a meat block and effectively cleans and dresses the same. If a coarser scraping is desired, a rasp member may be substituted for the brush.

From the foregoing description it will be seen that the improved meat block scraper and dresser is of very simple and novel construction, and is well adapted for the purposes set forth.

What I claim as my invention is:

A device of the class described, comprising a body portion, an electric motor carried thereby and having a drive shaft extend into said body portion, a ring gear having teeth on its inner circumferential side within said body portion, a stud shaft having an enlarged head with a ball-bearing therein keyed to said ring gear and projecting from said body portion, the aforementioned drive shaft having its lower end journaled within the bearing in the head of the stud shaft, a gear wheel on the drive shaft, a larger gear meshing with said gear, a shaft for the larger gear, a smaller gear on the last-mentioned shaft engaging the teeth of the ring gear, and a circular dressing member removably and revolubly mounted on the outer portion of said stud shaft.

In testimony whereof, I affix my signature.

MAX M. MENZEL.